(12) United States Patent
Hawtof et al.

(10) Patent No.: US 9,199,870 B2
(45) Date of Patent: Dec. 1, 2015

(54) ELECTROSTATIC METHOD AND APPARATUS TO FORM LOW-PARTICULATE DEFECT THIN GLASS SHEETS

(75) Inventors: Daniel Warren Hawtof, Corning, NY (US); Brenton Allen Noll, Corning, NY (US); Srinivas Vemury, Wilmington, NC (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 13/477,566

(22) Filed: May 22, 2012

(65) Prior Publication Data
US 2013/0316136 A1    Nov. 28, 2013

(51) Int. Cl.
*C03B 19/14* (2006.01)
(52) U.S. Cl.
CPC ......... *C03B 19/1446* (2013.01); *C03B 19/1492* (2013.01); *C03B 19/1423* (2013.01); *Y10T 428/24355* (2015.01); *Y10T 428/268* (2015.01)
(58) Field of Classification Search
CPC ............ C03B 19/1423; C03B 19/1446; C03B 19/1492
USPC .......................................................... 65/17.3
See application file for complete search history.

(56) References Cited

U.S. PATENT DOCUMENTS

| | | |
|---|---|---|
| 1,998,300 A | 4/1935 | Ackermann |
| 2,418,208 A | 4/1947 | Walker |
| 2,719,581 A | 10/1955 | Greathead |
| 3,338,696 A | 8/1967 | Dockerty |
| 3,437,470 A | 4/1969 | Overman |
| 3,682,609 A | 8/1972 | Dockerty |
| 3,806,570 A | 4/1974 | Flamenbaum et al. |
| 3,844,751 A | 10/1974 | Stewart |
| 4,082,526 A | 4/1978 | Estes et al. |
| 4,152,166 A | 5/1979 | Rogers |
| 4,298,385 A | 11/1981 | Claussen et al. |
| 4,494,968 A | 1/1985 | Bhagavatula et al. |
| 4,735,677 A | 4/1988 | Kawachi et al. |
| 5,124,287 A | 6/1992 | Wehrenberg et al. |

(Continued)

FOREIGN PATENT DOCUMENTS

| | | |
|---|---|---|
| CN | 103964413 A | 8/2014 |
| DE | 155896 | 7/1982 |

(Continued)

OTHER PUBLICATIONS

Machine Translation of JP-09286621. Orginal document published Nov. 4, 1997.*

(Continued)

*Primary Examiner* — Matthew Daniels
*Assistant Examiner* — Cynthia Szewczyk
(74) *Attorney, Agent, or Firm* — Russell S. Magaziner

(57) ABSTRACT

A high-surface quality glass sheet is formed using a roll-to-roll glass soot deposition and sintering process. The glass sheet formation involves providing glass soot particles, depositing a first fraction of the glass soot particles on a deposition surface to form a supported soot layer, electrostatically attracting and collecting a second fraction of the glass soot particles onto a surface of a charged plate, removing the soot layer from the deposition surface to form a soot sheet, and heating at least a portion of the soot sheet to sinter the glass soot particles to form a glass sheet.

24 Claims, 3 Drawing Sheets

(56) References Cited

U.S. PATENT DOCUMENTS

| | | |
|---|---|---|
| 5,194,083 A | 3/1993 | Lehto |
| 5,482,863 A | 1/1996 | Knobel |
| 5,482,864 A | 1/1996 | Knobel |
| 5,599,371 A | 2/1997 | Cain et al. |
| 5,667,547 A | 9/1997 | Christiansen et al. |
| 5,705,062 A | 1/1998 | Knobel |
| 5,922,100 A | 7/1999 | Cain et al. |
| 5,942,124 A | 8/1999 | Tuunanen |
| 6,020,211 A | 2/2000 | Tuunanen |
| 6,068,891 A | 5/2000 | O'Dell et al. |
| 6,121,177 A | 9/2000 | Guigonis et al. |
| 6,193,892 B1 | 2/2001 | Krueger et al. |
| 6,207,463 B1 | 3/2001 | Tuunanen |
| 6,207,603 B1 | 3/2001 | Danielson et al. |
| 6,263,706 B1 | 7/2001 | Deliso et al. |
| 6,294,342 B1 | 9/2001 | Rohr et al. |
| 6,328,807 B1 | 12/2001 | Boek et al. |
| 6,606,883 B2 | 8/2003 | Hrdina et al. |
| 6,736,633 B1 | 5/2004 | Dawson-Elli et al. |
| 6,743,011 B2 | 6/2004 | Bakshi et al. |
| 6,837,076 B2 | 1/2005 | Hawtof |
| 6,974,786 B2 | 12/2005 | Helfinstine et al. |
| 7,226,537 B2 | 6/2007 | Broyer et al. |
| 7,299,657 B2 | 11/2007 | Kohli |
| 7,662,732 B2 | 2/2010 | Choi et al. |
| 7,677,058 B2 | 3/2010 | Hawtof et al. |
| 7,704,905 B2 | 4/2010 | Addiego et al. |
| 7,785,535 B2 | 8/2010 | Chen et al. |
| 8,021,747 B2 | 9/2011 | Yi et al. |
| 8,062,733 B2 | 11/2011 | Hawtof et al. |
| 8,137,469 B2 | 3/2012 | Hawtof et al. |
| 8,138,568 B2 | 3/2012 | Yoon et al. |
| 8,181,485 B2 | 5/2012 | Coffey et al. |
| 8,359,884 B2 | 1/2013 | Hawtof |
| 8,366,853 B2 | 2/2013 | Liu et al. |
| 8,431,066 B2 | 4/2013 | Liu |
| 8,438,876 B2 | 5/2013 | Noni, Jr. |
| 8,623,258 B2 | 1/2014 | Liu |
| 8,656,737 B2 | 2/2014 | Nakamura et al. |
| 8,746,013 B2 | 6/2014 | Geremew et al. |
| 8,857,216 B2 | 10/2014 | Geremew et al. |
| 2002/0085977 A1* | 7/2002 | Fotland et al. .................. 424/45 |
| 2003/0113679 A1 | 6/2003 | Bakshi et al. |
| 2003/0167796 A1 | 9/2003 | Hawtof |
| 2004/0007019 A1 | 1/2004 | Kohli |
| 2004/0089237 A1 | 5/2004 | Pruett et al. |
| 2004/0197575 A1 | 10/2004 | Bocko et al. |
| 2006/0003279 A1 | 1/2006 | Best |
| 2006/0043861 A1 | 3/2006 | Liu |
| 2006/0063351 A1 | 3/2006 | Jain |
| 2007/0039353 A1 | 2/2007 | Kamiya |
| 2007/0130995 A1 | 6/2007 | Hawtof et al. |
| 2007/0267289 A1* | 11/2007 | Jabs et al. ...................... 204/170 |
| 2008/0196449 A1 | 8/2008 | Addiego et al. |
| 2008/0280057 A1 | 11/2008 | Hawtof et al. |
| 2010/0124709 A1 | 5/2010 | Hawtof et al. |
| 2010/0143601 A1 | 6/2010 | Hawtof et al. |
| 2010/0291346 A1 | 11/2010 | Hawtof et al. |
| 2010/0319401 A1 | 12/2010 | Coffey et al. |
| 2011/0014445 A1 | 1/2011 | Hawtof |
| 2011/0023548 A1 | 2/2011 | Garner et al. |
| 2011/0167871 A1 | 7/2011 | Vehmas et al. |
| 2011/0223408 A1 | 9/2011 | Kadomura |
| 2011/0230373 A1 | 9/2011 | Liu |
| 2011/0277632 A1 | 11/2011 | Pant et al. |
| 2012/0040146 A1 | 2/2012 | Garner et al. |
| 2012/0318024 A1 | 12/2012 | Mori et al. |
| 2013/0052413 A1 | 2/2013 | Hawtof |
| 2013/0218281 A1 | 8/2013 | Broadley et al. |
| 2013/0316136 A1 | 11/2013 | Hawtof et al. |
| 2014/0291287 A1 | 10/2014 | Stockum et al. |

FOREIGN PATENT DOCUMENTS

| | | |
|---|---|---|
| EP | 476693 A2 | 3/1992 |
| EP | 1 153 894 | 11/2001 |
| EP | 1 535 884 | 6/2005 |
| JP | 61158874 A | 7/1986 |
| JP | 63252971 A | 10/1988 |
| JP | H09-286621 | 11/1997 |
| JP | 2013237159 A | 11/2013 |
| KR | 1074724 B1 | 10/2011 |
| KR | 2014021527 A | 2/2014 |
| WO | 0214579 A1 | 2/2002 |
| WO | 2005024908 A2 | 3/2005 |
| WO | 2007075138 A1 | 7/2007 |
| WO | 2008136924 A1 | 11/2008 |
| WO | 201008911 A2 | 1/2010 |
| WO | 2011/008911 | 1/2011 |
| WO | 2014034013 A1 | 3/2014 |
| WO | 2014139147 A1 | 9/2014 |
| WO | 2014180242 A1 | 11/2014 |

OTHER PUBLICATIONS

M. Awaad et al.; "Sintering of zircon: the role of additives"; British Ceramics Transactions, 2003, vol. 102, No. 2; pp. 69-72.

GlassOn Web. "The Achille Heel of a Wonderful Material: Toughened Glass." Nov. 2006. http://www.glassonweb.com/articles/article/330.

Hawtof et al.; "Glass Sheet and System and Method for Making Glass Sheet"; Pending U.S. Appl. No. 62/025,627, filed Jul. 17, 2014.

Lal et al.; "Substrate Such As for Use With Carbon Nanotubes"; U.S. Appl. No. 14/593,192, filed Jan. 9, 2015.

Huang et al.; "Patterened Growth and Contact Transfer of Well-Aligned Carbon Nanotube Films"; J. Phys. Chem. B 1999, 103; pp. 4223-4227.

Murakami et al.; "Direct synthesis of high-quality singled-walled carbon nanotubes on silicon and quartz substrates"; Chemical Physics Letters 377 (2003); pp. 49-54.

Murakami et al.; "Growth of vertically aligned single-walled carbon nanotube films on quartz substrates and their optical anisotropy", Chemical Physics Letters 385 (2004); pp. 298-303.

Saha et al.; "Films of Bare Single-Walled Carbon Nanotubes from Superacids with Tailored Electronic and Photoluminescence Properties"; American Chemical Society, vol. 6, No. 6 (2012); pp. 5727-5734.

Schnitzler et al.; "Incorporation, Oxidation and Pyrolysis of Ferrocene into Porous Silica Glass: a Route to Different Silica/Carbon and Silica/Iron Oxide Nanocomposites"; Inorganic Chemistry vol. 45, No. 26 (2006); pp. 10642-10650.

Ward et al.; "Substrate effects on the growth of carbon nanotubes by thermal decomposition of methane"; Chemical Physics Letters 376 (2003); pp. 717-725.

Hawtof; "Silica-Containing Sheet and Related System and Methods"; Pending U.S. Appl. No. 14/621,881, filed Feb. 13, 2015.

Hawtof et al ; "High Silica Content Substrate Such As for Use in Thin-Film Battery"; Pending U.S. Appl. No. 14/684,627, filed Apr. 13, 2015.

Xia et al.; "Growth and Characterization of LiCoO2 Thin Films for Microbatteries"; Advanced Materials for Micro- and Nano-Systems (AMMNS) (2005); http://18.7.29.232/handle/1721.1/7364.

Liu et al.; "Discrete-element method for particle capture by a body in an electrostatic field"; Int. J. Numer. Meth. Engng (2010) 84; pp. 1589-1612.

Vemury et al.; "Charging and Coagulation During Flame Synthesis of Silica"; J. Aerosol Sci., vol. 27, No. 6 (1996); pp. 951-966.

* cited by examiner

ELECTROSTATIC METHOD AND APPARATUS TO FORM LOW-PARTICULATE DEFECT THIN GLASS SHEETS

BACKGROUND

The present disclosure relates generally to glass sheets and more specifically to a glass soot deposition and sintering process for forming high surface quality glass sheets and ribbons of glass. Such glass products can be formed free or substantially free of surface particulates.

Glass sheet materials can be formed using a variety of different methods. In a float glass process, for example, a sheet of solid glass is made by floating molten glass on a bed of molten metal. This process can be used to form glass sheets having uniform thickness and very flat surfaces. However, float glass processes necessarily involve direct contact between the glass melt and the molten metal, which can lead to undesired contamination at the interface and less than pristine surface quality. In order to produce high quality float glass sheets with pristine surface properties on both major surfaces, float glass is typically subjected to one or more surface polishing steps. This processing adds additional expense. Moreover, it is believed that the float process has not been used to make rollable (i.e., very thin) glass sheets.

An additional method for forming glass sheet materials is the fusion draw process. In this process, molten glass is fed into a trough called an isopipe, which is overfilled until the molten glass flows evenly over both sides. The molten glass then rejoins, or fuses, at the bottom of the trough where it is drawn to form a continuous sheet of flat glass. Because both major surfaces of the glass sheet do not directly contact any support material during the forming process, high surface quality in both major surfaces can be achieved. Due to the dynamic nature of the fusion draw process, however, the number of glass compositions suitable for fusion draw is limited to those that possess the requisite properties in the molten phase (e.g., liquidus viscosity, strain point, etc.). Further, the apparatus used in the fusion draw process can be expensive.

Thin, rollable glass sheets having a thickness of 200 microns or less can be made using a glass soot deposition and sintering method. In such a method, particles of glass soot are formed via gas-phase reactions and deposited onto a rotating drum to form a soot layer that is released from the drum as a self-supporting soot sheet that is in turn sintered to form a glass sheet. During the act of forming the soot sheet, rogue soot particles made during the soot forming and deposition processes and not incorporated into the glass soot layer may be later incorporated into a surface of the soot sheet and undesirably incorporated into a surface of the resulting glass sheet.

Approximately 50% of the formed soot particles are homogeneously incorporated into a soot layer that is released from the deposition surface to form the soot sheet. While many of the excess particles can be collected by an exhaust system located in the vicinity of the deposition zone, a potentially significant and deleterious volume of soot particles can deposit onto the soot sheet. Such particles, rather than being homogeneously incorporated into the soot sheet, alight and spall onto the soot sheet and ultimately manifest as surface defects in the resulting glass. It can be problematic to use a high volume or high velocity exhaust system in the vicinity of the soot sheet because the gas velocity generated by the exhaust, while effective at directing soot particles away from the soot sheet, can act on and tear or rip the soot sheet.

In view of the foregoing, because thin defect-free glass sheets are desirable, it would be desirable to develop a robust process to form soot sheets that are free or substantially free of unwanted surface particles and defects caused by such particles.

SUMMARY

The apparatus and corresponding process disclosed herein can produce surface-particulate-free glass sheets to a specified thickness and composition without the need for post-formation lapping or polishing. The glass sheets can be essentially free of particulate-induced defects. The glass sheets can comprise one or more layers, components, or phases. Such glass sheets can be used, for example, as substrates for microelectronics, and as substrates for forming superconducting materials, etc.

A method of forming surface particulate-free glass sheets involves a glass soot deposition and sintering process. According to various embodiments, the process involves providing glass soot particles, depositing a first fraction of the glass soot particles on a deposition surface to form a supported soot layer, electrostatically attracting and collecting a second fraction of the glass soot particles onto a surface of a charged plate, removing the soot layer from the deposition surface to form a soot sheet, and heating at least a portion of the soot sheet to sinter the glass soot particles to form a glass sheet. A third fraction of the glass soot particles, corresponding to a further fraction of the glass soot particles that are not deposited to form a supported soot layer, can be collected using an optional exhaust system.

During the acts of forming and depositing the glass soot particles, at least some of the soot particles are charged electrically and subsequently collected by an oppositely-charged electrostatic plate. The glass soot particles can be charged by employing suitable charging plates that frame a portion of the deposition zone, or merely as a result of the gas burner thermodynamics, which can generate charged glass soot particles in situ. In embodiments, the glass soot particles are charged positively and the electrostatic plate is charged negatively. With the disclosed method and apparatus, it is possible to effectively control the disposition of excess glass soot particles by using a selective force that can sequester the glass soot particles without having an adverse effect on the glass sheet. Specifically, an electrostatic force acts only on the charged glass soot particles not previously incorporated into the soot layer and, in contrast to a large pressure differential/exhaust approach, is not detrimental to the soot sheet.

As will be appreciated, the supported soot layer that is released from the deposition surface has two major opposing surfaces. The "contact surface" is the surface that is formed in contact with the deposition surface of the soot receiving device, while the "free surface" is the opposing surface. In a further embodiment, after the supported soot layer is released from the deposition surface to form a soot sheet, second glass soot particles can be deposited on one or both of the "contact surface" or the "free surface." The disclosed electrostatic approach for preventing glass soot particles from contacting a previously-formed soot sheet can be used in conjunction with one or more soot forming/soot deposition steps.

An apparatus for forming a glass sheet via a glass soot deposition and sintering process comprises a soot-providing device for providing glass soot particles, a rotatable drum having an outer curved deposition surface on which a first fraction of the glass soot particles can be deposited to form a soot layer, and a soot-gathering device for collecting a second fraction of the glass soot particles.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments, and are intended to provide an overview or framework for understanding the nature and character of the invention as it is claimed. The accompanying drawings are included to provide a further understanding of the disclosure, and are incorporated into and constitute a part of this specification. The drawings illustrate various embodiments and together with the description serve to explain the principles and operations of the invention.

DETAILED DESCRIPTION

Figure 1:
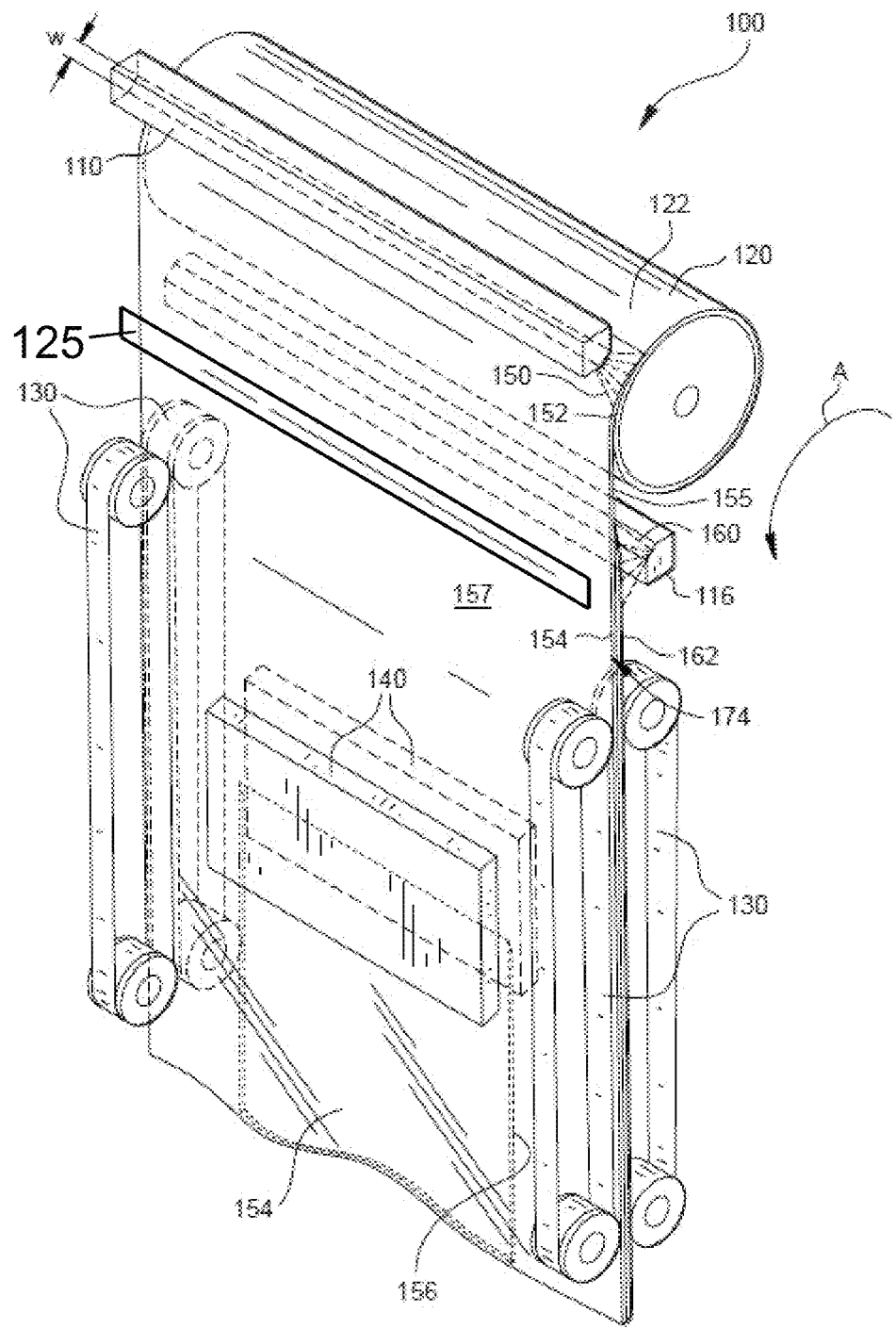
FIG. 1 is a schematic illustration of an apparatus for forming a defect-free thin glass sheet.

An apparatus for forming a high surface quality glass sheet according to various embodiments is shown schematically in FIG. 1. The apparatus 100 comprises a pair of soot-providing devices 110, 116, a soot-receiving device 120, a soot-gathering device 125, a soot sheet-guiding device 130, and a soot sheet-sintering device 140.

As will be disclosed in further detail below, embodiments of the disclosure relate to the formation of a surface particle-free, surface defect-free glass sheet by sintering a soot sheet. During the process of forming the soot sheet, an electrostatic soot-gathering device 125 is used to capture excess soot particles generated by first soot-providing device 110 and (optionally) second soot-providing device 116 in order to prevent deposition of these excess soot particles on a soot sheet after it has been formed. The soot-gathering device 125 thus prevents particulate contamination of surfaces of the soot sheet while the soot sheet is staged for sintering. In embodiments, high CTE glasses, which typically have a relatively low melting (and sintering) temperature, can be formed using the disclosed soot-based process.

Referring still to FIG. 1, in a deposition step, glass soot particles 150 formed by a first soot-providing device 110 are deposited on a deposition surface 122 of the soot-receiving device 120. The soot-receiving device 120 may be in the form of a rotatable drum (e.g., rotary drum) or belt and thus can comprise a continuous deposition surface 122. The soot particles 150 are deposited to form a soot layer 152 on the deposition surface 122. The soot layer 152 can be released from the deposition surface 122 as a free-standing, continuous soot sheet 154 having a contact surface 155 and a free surface 157. The act of releasing the soot layer 152 from the deposition surface 122 can occur without physical intervention as the result of, for example, thermal mismatch or a mismatch in coefficients of thermal expansion between the soot layer and the deposition surface and/or under the effect of the force of gravity. After the first soot sheet 154 is released from the soot-receiving device 120, a soot sheet-guiding device 130 can guide movement of the first soot sheet 154.

In an optional embodiment, in a second deposition step, second glass soot particles 160 formed by a second soot-providing device 116 can be deposited on the contact surface 155 of first soot sheet 154 to form a second soot layer 162. The addition of the second soot layer 162 and any subsequent soot layer (not shown) to the first soot sheet 154 forms a composite soot sheet 174. The soot sheet-guiding device 130 can further guide movement of the composite soot sheet 174 through a soot sheet-sintering device 140, which sinters and consolidates a portion of the composite soot sheet 174 to form a glass sheet 156. In complementary embodiments, a second soot layer can be deposited on the free surface 157 of the soot sheet 154 in addition to or in lieu of forming a second soot layer on the contact surface 155 of the soot sheet 154.

During the soot formation and deposition processes, a soot-gathering device 125 can be used to collect excess soot, i.e., soot that is not incorporated into first soot layer 152 or the optional second soot layer 162. By gathering the excess soot, it is possible to minimize or substantially eliminate particulate contamination of the surfaces of the product glass. Soot particles allowed to deposit on the soot sheet can create discontinuities and surface roughness that can adversely affect optical and mechanical properties of the glass sheet as well as post-processing operations.

Thus, a process of forming a glass sheet comprises providing glass soot particles, depositing a first fraction of the glass soot particles on a deposition surface to form a supported soot layer, electrostatically attracting and collecting a second fraction of the glass soot particles onto a surface of a charged plate, and removing the soot layer from the deposition surface to form a soot sheet. It will be appreciated that the electrostatic attraction of a second fraction of the glass soot particles can occur before, during and after removing the soot layer from the deposition surface. In embodiments, the processes of depositing a first fraction of the glass soot particles and electrostatically attracting a second fraction of the glass soot particles are occurring simultaneously.

At least a portion of the soot sheet can be heated to form a sintered glass sheet. In embodiments, a sum of the first and second fractions of glass soot particles equals at least 50% of a total number of the glass soot particles produced by the soot-providing device(s) during the process (e.g., at least 50, 60, 70, 80, 90, 95, 98, 99 or 100%). In other words, a majority of the soot particles produced are either formed into a soot sheet or captured, either by a soot-gathering device or by a soot-gathering device operating in conjunction with an exhaust system. In further embodiments, a soot-gathering device captures at least 1% (e.g., at least 1, 2, 5 or 10%) of the excess glass soot particles, i.e., at least 1% of the glass soot particles not used to form a soot layer. Additional aspects of the process and apparatus are disclosed in detail herein below.

Although a variety of devices may be used to form glass soot particles, by way of example, soot providing devices 110, 116 may comprise one or more flame hydrolysis burners, such as those used in outside vapor deposition (OVD), vapor axial deposition (VAD) and planar deposition processes. Suitable burner configurations are disclosed in U.S. Pat. Nos. 6,606,883, 5,922,100, 6,837,076, 6,743,011 and 6,736,633, the contents of which are incorporated herein by reference in their entirety.

The soot-providing devices 110, 116 may comprise a single burner or multiple burners. An example burner has an output surface having length l and width w. The output surface comprises N columns of gas orifices where N can range from 1 to 20 or more. In an embodiment, each orifice comprises a 0.076 cm diameter hole. The length l of the output surface can range from about 2.5 to 30.5 cm or more, and the width can range from 0.1 to 7.5 cm. Optionally, multiple burners can be configured into a burner array that can produce a substantially continuous stream of soot particles over the length and width of the array.

A burner array, for example, may comprise a plurality of individual burners (e.g., placed end-to-end) configured to form and deposit a temporally and spatially uniform layer of glass soot. Thus, each soot-providing device can be used to form an individual layer of soot having a substantially homogeneous chemical composition and a substantially uniform thickness. By "uniform composition" and "uniform thickness" is meant that the composition and thickness variation over a given area is less than or equal to 20% of an average composition or thickness. In certain embodiments, one or both of the compositional and thickness variation of a soot sheet can be less than or equal to 10% of their respective average values over the soot sheet.

An example burner comprises 9 rows of gas orifices. In forming silica glass soot, for example, according to one embodiment, the centerline row (e.g., row 5) provides a silica gas precursor/carrier gas mixture. The immediately adjacent rows (e.g., rows 4 and 6) provide oxygen gas for stoichiometry control of the silica gas precursor. The next two rows of gas orifices on either side of the centerline (e.g., rows 2, 3, 7 and 8) provide additional oxygen, the flow rate of which can be used to control stoichiometry and soot density, and provide an oxidizer for the ignition flame. The outermost rows of orifices (e.g., rows 1 and 9) can provide an ignition flame mixture of, for example, $CH_4/O_2$ or $H_2/O_2$. Example gas flow rate ranges for such a 9 row linear burner are disclosed in Table 1. A silicon-containing gaseous precursor can be used to form a first soot sheet, upon which an optional second soot sheet can be formed.

TABLE 1

Example gas flow rates for 9 row linear burner to form silica soot sheet

| Gas | Burner row(s) | Example flow rate |
| --- | --- | --- |
| OMCTS | 5 | 15 g/min |
| $N_2$ | 5 | 40 SLPM |
| $O_2$ | 4, 6 | 18 SLPM |
| $O_2$ | 2, 3, 7, 8 | 36 SLPM |
| $CH_4$ | 1, 9 | 36 SLPM |
| $O_2$ | 1, 9 | 30 SLPM |

The soot-providing devices may be held stationery during formation and deposition of the soot particles or, alternatively, the soot-providing devices may be moved (e.g., oscillated) with respect to the deposition surface. A distance from the burner output surface to the deposition surface can range from about 20 mm to 100 mm (e.g., 20, 25, 30, 35, 40, 45, 50, 55, 60, 65, 70, 75, 80, 85, 90, 95 or 100 mm).

Operation of the soot-providing device typically involves chemical reactions between precursor chemicals (e.g., gaseous compounds or atomized liquids vaporized in the flame) to form glass soot particles. Optionally, the chemical reactions can be further assisted by supplemental energy sources such as plasma or a supplemental heating device.

Silicon-containing precursor compounds, for example, can be used to form soot sheets comprising silica soot particles. An example silicon-containing precursor compound is octamethylcyclotetrasiloxane (OMCTS). OMCTS can be introduced into a burner or burner array together with $H_2, O_2$, $CH_4$ or other fuels where it is oxidized and hydrolyzed to produce silica soot particles.

As-produced or as-deposited, the soot particles may consist essentially of a single phase (e.g., a single oxide), which can be sintered to form, for example, un-doped, high-purity glass. Alternatively, the soot particles may comprise two or more components or two or more phases, which can be sintered to form, for example, doped glass. Multicomponent or multiphase glass sheets, for example, can be made by incorporating a titanium oxide precursor or a phosphorous oxide precursor into the OMCTS gas flow. Example titanium and phosphorous oxide precursors include various soluble metal salts and metal alkoxides such as halides of phosphorous and titanium (IV) isopropoxide.

In the example of a flame hydrolysis burner, doping can take place in situ during the flame hydrolysis process by introducing dopant precursors into the flame. In a further example, such as in the case of a plasma-heated soot sprayer, soot particles sprayed from the sprayer can be pre-doped or, alternatively, the sprayed soot particles can be subjected to a dopant-containing plasma atmosphere such that the soot particles are doped in the plasma. In a still further example, dopants can be incorporated into a soot sheet prior to or during sintering of the soot sheet. Example dopants include elements from Groups IA, IB, IIA, IIB, IIIA, IIIB, IVA, IVB, VA, VB and the rare earth series of the Periodic Table of Elements.

The soot particles can have an essentially homogeneous composition, size and/or shape. Alternatively, one or more of the composition, size and shape of the soot particles can vary. For example, soot particles of a main glass component can be provided by one soot-providing device, while soot particles of a dopant composition can be provided by a different soot-providing device. In certain embodiments, soot particles can mix and/or adhere to one another during the acts of forming and depositing the soot particles to form composite particles. It is also possible that the soot particles are substantially prevented from adhering to each other to form mixed particles prior to or while being deposited on a deposition surface.

A size of the soot particles provided by a soot providing device can range from 10-600 nm, though larger agglomerated particles (e.g., 100 nm-100 microns) can be formed in the gas phase during the flame hydrolysis process.

Referring still to FIG. 1, deposition surface 122 comprises a peripheral portion of the soot-receiving device 120 and can be formed of a refractory material. In an embodiment, the deposition surface 122 is formed of a material that is chemically and thermally compatible with both the first soot particles 150 and the deposited soot layer 152, and from which the soot layer can be easily removed. Example soot-receiving devices 120 comprise a coating or cladding of a refractory material (e.g., silica, silicon carbide, graphite, zirconia, etc.) formed over a core material of, for example, steel, aluminum or metal alloy. Further soot-receiving devices can comprise a unitary part consisting essentially of a suitable refractory material such as quartz.

The soot-receiving device 120 and particularly the deposition surface 122 can be configured in a variety of different ways and have a variety of shapes and/or dimensions. For example, a width of the deposition surface can range from about 2 cm to 2 m, although smaller and larger dimensions are possible. A cross-sectional shape of the soot-receiving device 120 can be circular, oval, elliptical, triangular, square, hexagonal, etc., and a corresponding cross-sectional dimension (e.g., diameter or length) of the soot-receiving device 120 can also vary. For example, a diameter of a soot-receiving device having a circular cross section can range from about 2 cm to 50 cm. An example soot-receiving device 120 comprises a quartz cylinder having a 250 mm inner diameter, a 260 mm outer diameter, and a 24 cm wide deposition surface.

In the examples of circular or oval cross-sections, the deposition surface 122 can comprise a closed, continuous surface, while in the examples of elliptical, triangular, square or hexagonal cross-sections, the deposition surface can comprise a segmented surface. By appropriately selecting the size and dimensions of the soot-receiving device 120, a continuous or semi-continuous soot sheet can be formed.

The deposition surface 122 can be a smooth surface or optionally include regular or irregular patterning in the form of raised or lowered protrusions across a range of length scales. A smooth surface can be used without additional polishing or after one or more post-formation polishing steps. The patterning can range from one or more discrete facets to a general roughing of the surface. A deposited soot layer can conform to the patterning in the deposition surface. A pattern formed in the first soot layer can be retained in the first soot sheet as it is separated from the deposition surface and, in turn, transferred to and preserved in the sintered surface of the product glass resulting in an embossed glass sheet.

In a variation of the above-described deposition surface-derived embossing, one or both of the contact surface and the free surface of a first soot sheet can be patterned after it is removed from the deposition surface but prior to sintering. Further, a surface of a second soot sheet can be patterned after it is formed over the first soot sheet but prior to sintering. For example, by gently touching a soot sheet surface, Applicants have patterned the soot sheet surface with a fingerprint. Upon sintering of the soot sheet, the fingerprint pattern is retained in the resulting glass sheet.

In certain embodiments, the soot-receiving device 120 is rotated during the act of depositing soot particles 150 in order to form a soot layer 152 thereon. The rotation can be unidirectional, e.g., clockwise or counter-clockwise. A direction of rotation according to one embodiment is indicated by arrow A in FIG. 1. Optionally, the soot-receiving device may oscillate during the soot deposition process, i.e., the rotation direction may change intermittently. A linear velocity of the deposition surface 122 of the soot-receiving device 120 can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher.

Soot particles 150 are deposited on only a portion of the deposition surface 122, and the deposited soot layer 152 is removed to form a free-standing continuous or semi-continuous first soot sheet 154 having length L. In embodiments, the portion of the deposition surface 122 upon which the soot particles 150 are deposited is within the line of sight from the output surface of the burner. A width of the deposited layer 152 (and nominally of the soot sheet 154) is W.

In certain embodiments, the soot layer can be continuously formed on and continuously removed from the deposition surface. During formation of a soot layer, soot particles bond to a certain degree with each other and with the deposition surface. The higher the average temperature of the soot particles when they are being deposited, the more likely they are to bond with each other and form a dense and mechanically robust soot sheet. However, higher deposition temperatures also promote bonding between the soot particles and the deposition surface, which can interfere with releasing of the soot sheet.

Bonding between soot particles and the deposition surface can be controlled by controlling a temperature gradient between a location where the soot particles are deposited and a location where the soot layer 152 is released to form the first soot sheet 154. For instance, if the soot layer and the deposition surface have sufficiently different coefficients of thermal expansion (CTEs), the release may occur spontaneously due to stress induced by the temperature gradient. In certain embodiments, removal of the deposited soot layer from the deposition surface can be made easier by forming a soot layer having a width W that is less than the width of the deposition surface 122. To obtain a substantially uniform temperature across the deposition surface, the soot-receiving device can be heated or cooled either from the inside, the outside, or both.

In order to minimize contamination of the surfaces of the soot sheet, soot particles that are not incorporated into a soot layer can be removed from the deposition zone and from downstream of the deposition zone using an exhaust system. However, the air velocity from such an exhaust can create a pressure wave capable of rupturing or tearing the soot sheet prior to sintering. Thus, the exhaust approach may not be satisfactory for providing particulate control in a vicinity of the soot sheet.

As an alternative or compliment to the exhaust approach, disclosed herein is an electrostatic method for attracting and sequestering excess soot particles. In embodiments, soot particles produced by a soot-providing device can be charged either naturally or using a charging source of one polarity, and then attracted to a body that is provided with an opposite charge. An advantage of the electrostatic method over certain implementations of the exhaust method is the lack of a gas velocity that can damage the soot sheet.

The soot-gathering device 125 can attract and collect a significant fraction of soot particles that are not incorporated into a soot layer in order to prevent these superfluous particles from depositing on a surface of a soot sheet. In embodiments, the soot-gathering device can attract and sequester at least 1% of the soot particles that are formed by the soot providing device(s) but not incorporated into a soot layer. For example, the soot-gathering device can attract and sequester at least 2% (e.g., at least 2, 5, 0, 20 or 50%) of the excess soot particles. In one particular embodiment, the soot-gathering device can capture substantially all of the soot particles that are not otherwise incorporated into the soot layer.

In an example embodiment, soot particles are imbued with a positive charge due to the burner flame thermodynamics. A negatively-charged soot-gathering device is provided proximate to the deposition zone in a location effective to collect charged soot particles that are not incorporated into a soot layer.

For instance, the soot-gathering device may comprise an electrostatically-charged plate that is positioned, for example, across a width of the soot sheet downstream of the release point of the soot layer from the deposition surface. The plate is adapted to attract and sequester soot particles that would otherwise spall onto the soot sheet and disrupt the soot sheet surface. By using a soot-gathering device as disclosed herein, it is possible to improve the smoothness and optical properties of a product glass sheet.

The number, size, and distribution of surface particles can enable or prevent the use of glass sheets in various applications. For certain applications, glass sheets having pristine or substantially pristine surfaces are preferred. In a comparative process not employing a soot-gathering device, a measurement was made of surface particulates on an as-prepared soot sheet. A histogram of particle number versus particle size showed, for each square centimeter of soot sheet, 15-20 particles on average having a particle size between 25 and 50 microns, and 3-5 particles having a particle size greater than 50 microns.

Figure 3:
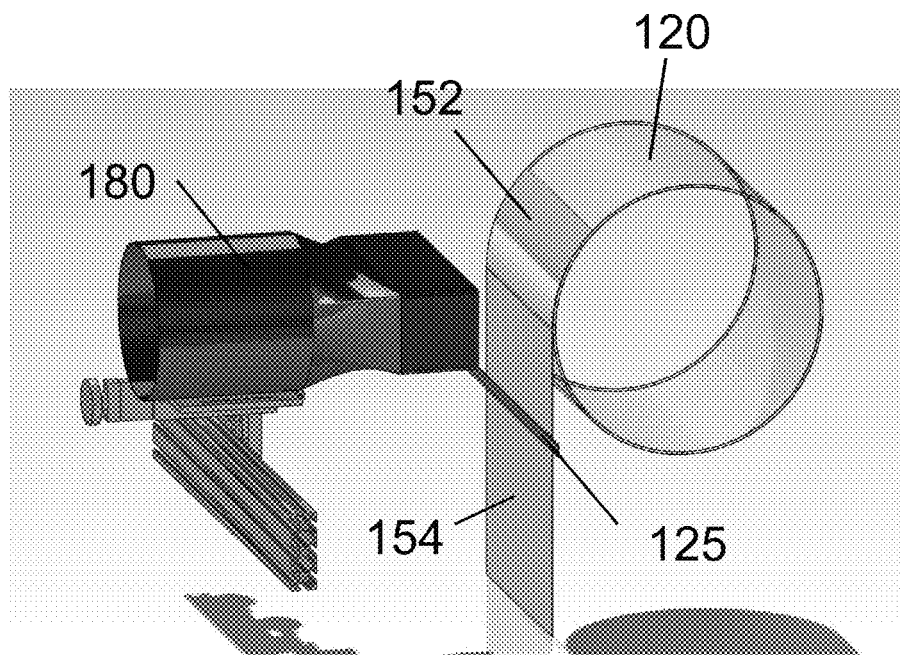
FIG. 3 is a schematic of an apparatus for forming a defect-free thin glass sheet according to one embodiment.
Figure 4:
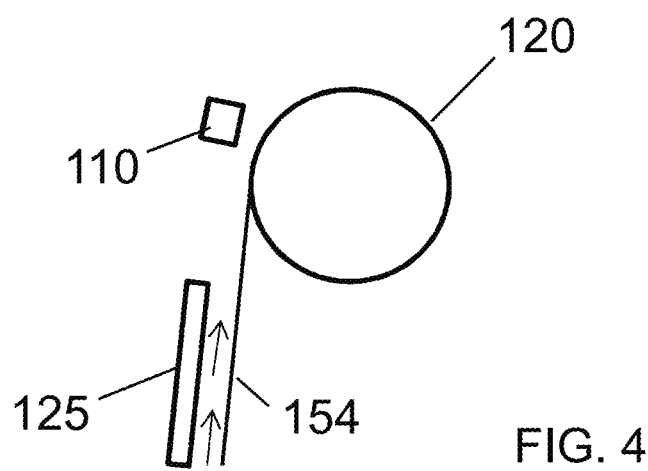
FIG. 4 is a schematic of an apparatus for forming a defect-free thin glass sheet according to a further embodiment.

In an example embodiment, a soot-gathering device comprises a conductive plate that is connected to the negative terminal only of a 6000 volt, 5 milliamp power supply (Ultravolt, Ronkonkoma, N.Y.). In example tests, the plate measured 1 mm×13 mm×330 mm and was configured to be 1-10 mm from the soot sheet surface, and 100-120 mm from the burner. When a supplemental, exhaust system 180 is used, the conductive plate is arranged to be 65-85 mm from the exhaust duct. The conductive plate was oriented such that the major face of the plate (measuring 13×330 mm) was facing the soot sheet. A simplified schematic showing the positioning of the plate is shown in FIG. 3. A further arrangement is depicted in FIG. 4, where a soot-gathering device 125 is positioned proximate to one face of a soot sheet 154 and an exhaust system is configured to provide a gas flow between the soot-gathering device 125 and the soot sheet 154. As indicated by the arrows, according to one embodiment, the flow of gas can be substantially parallel to a surface of the soot sheet. Such a flow of gas may include a purge gas that is introduced at one end of the space defined between the soot-gathering device and the soot sheet. A purge gas may include oxygen, air, or an inert gas such as argon or nitrogen. The gas flow may be substantially parallel to a face of the soot sheet, but in any suitable direction, including up, down, in a machine direction (i.e., direction of motion of the soot sheet) or transverse to a machine direction.

In an example process using the described soot-gathering device, a measurement was made of surface particulates on an as-prepared soot sheet. A histogram of particle number versus particle size showed less than 5 particles per square centimeter (e.g., less than 5, 4, 3, 2 or 1) having a particle size between 25 and 50 microns, and less than 5 particles per square centimeter (e.g., less than 5, 4, 3, 2 or 1) having a particle size greater than 50 microns. This represents a substantial decrease in the number of soot particles incorporated onto a surface of the soot sheet.

In embodiments, the resulting glass sheet is substantially free of surface defects, e.g., surface defects derived from glass soot particles. Defects derived from surface particles may comprise a single soot particle or an agglomerate of a plurality of soot particles. In further embodiments, the glass sheet comprises at most ten (e.g., at most 1, 2, 5 or 10) surface particles per square meter having a size greater than 5 nm. In still further embodiments, the glass sheet comprises a defect density of at most ten (e.g., at most 1, 2, 5 or 10) particles/m$^2$ where the particles have a size between 5 nm and 100 microns, e.g., between 5 and 600 nm, or between 100 nm and 100 microns, or between 25 and 50 microns, or between 50 and 100 microns.

In addition to improving the optical quality of the product glass sheets, the disclosed approach for minimizing the incorporation of glass soot particles onto a surface of the glass sheet can improve the mechanical strength of the glass sheet by reducing or eliminating surface defects that might otherwise induce a flaw or crack in the glass. A low defect density in the product glass sheet can be realized without any post-formation polishing or lapping.

A soot-gathering device can have any dimensions suitable for attracting and collecting glass soot particles. An example conductive plate can have a length of from 2 cm to 2 m, i.e., on the order of the width dimension of the soot deposition surface. Of course, it will be appreciated that a length of the soot-gathering device can be less than or greater than the width dimension of the deposition surface. A width and thickness of the soot-gathering device can independently range from about 1 cm to 2 m. In embodiments, the soot-gathering device can be configured as a strip (having a length that is substantially greater than both a width and a thickness) or a plate (having a length and width that are each substantially greater than a thickness).

It will be appreciated that, in addition to the active, electrostatic collection of soot particles, the soot-gathering device may act as a passive shroud that simply prevents glass soot particles from contacting the soot sheet by forming a wall or barrier that is effective to block their access to the soot sheet. In an embodiment, a conductive plate can be both a passive and an active barrier to particle contamination of a soot sheet. As a passive barrier, a conductive plate can physically block glass soot particles located in one area from migrating into the soot sheet. As an active barrier, the electrostatically charged conductive plate can attract oppositely charged glass soot particles and accumulate them on a surface of the conductive plate rather than permitting them to migrate or diffuse into the soot sheet.

Example materials for such a conductive plate include stainless steel, titanium, copper, aluminum, nickel, as well as alloys and combinations thereof.

One or a plurality of soot-gathering devices can be used. Several soot-gathering devices can be positioned on one side of a soot sheet, for example, in order to provide a electrostatic barrier that is effective to prevent excess soot particles from depositing on the soot sheet. In alternative embodiments, soot-gathering devices can be positioned on opposite sides of a soot sheet such as, for example, when a second soot-providing device is used to form a second soot layer on a previously-formed soot sheet.

In one embodiment, a conductive plate can be operatively connected to one pole of a suitable power source (e.g., negative or positive output) while the soot particles are oppositely biased (positive or negative) in order to produce a soot-gathering device capable of attracting and collecting excess soot particles. In one embodiment, the glass soot particles can be negatively charged and the conductive plate positively charged. In a preferred embodiment, the glass soot particles can be positively charged and the conductive plate negatively charged. For example, the conductive plate can be negatively charged so as to generate an electrostatic field with a potential in a range of 0.2 to 10 kV/cm.

After the soot layer is formed on the deposition surface, a soot sheet is formed by separating the soot layer from the deposition surface. During the act of separating the soot layer from the deposition surface, a direction of motion of the separated soot sheet can be substantially tangential to a release point on the deposition surface. By "substantially tangential" is meant that the direction of motion of the soot sheet relative to a release point on the deposition surface deviates by less than about 10 degrees (e.g., less than 10, 5, 2 or 1 degrees) from a direction that is tangential to the deposition surface at the release point. Maintaining a substantially tangential release angle can reduce the stress exerted on the soot sheet at the release point.

For a soot-receiving device having a circular or oval cross section, the curvature of the deposition surface is a function of the cross-sectional diameter(s) of the soot-receiving device. As the diameter increases, the radius of curvature increases, and stresses in the deposited soot decrease as the shape of the deposited soot sheet approaches that of a flat, planar sheet.

In embodiments, the soot sheet that is released from the deposition surface has sufficient mechanical integrity to support its own mass (i.e., during the acts of removal from the deposition surface, handling, additional glass soot deposition and sintering) without fracturing or tearing. Process variables that can affect the physical and mechanical properties of the soot sheet include, inter alia, the thickness and density of the soot sheet, the curvature of the deposition surface, and the temperature of the soot layer and first soot sheet during formation.

It will be appreciated that the first soot sheet 154 comprises two major surfaces, only one of which contacts the deposition surface during formation of the soot layer. Thus, the two major surfaces of the first soot sheet 154 may be characterized and distinguished as the "contact surface" and the opposing "free surface."

Figure 2:
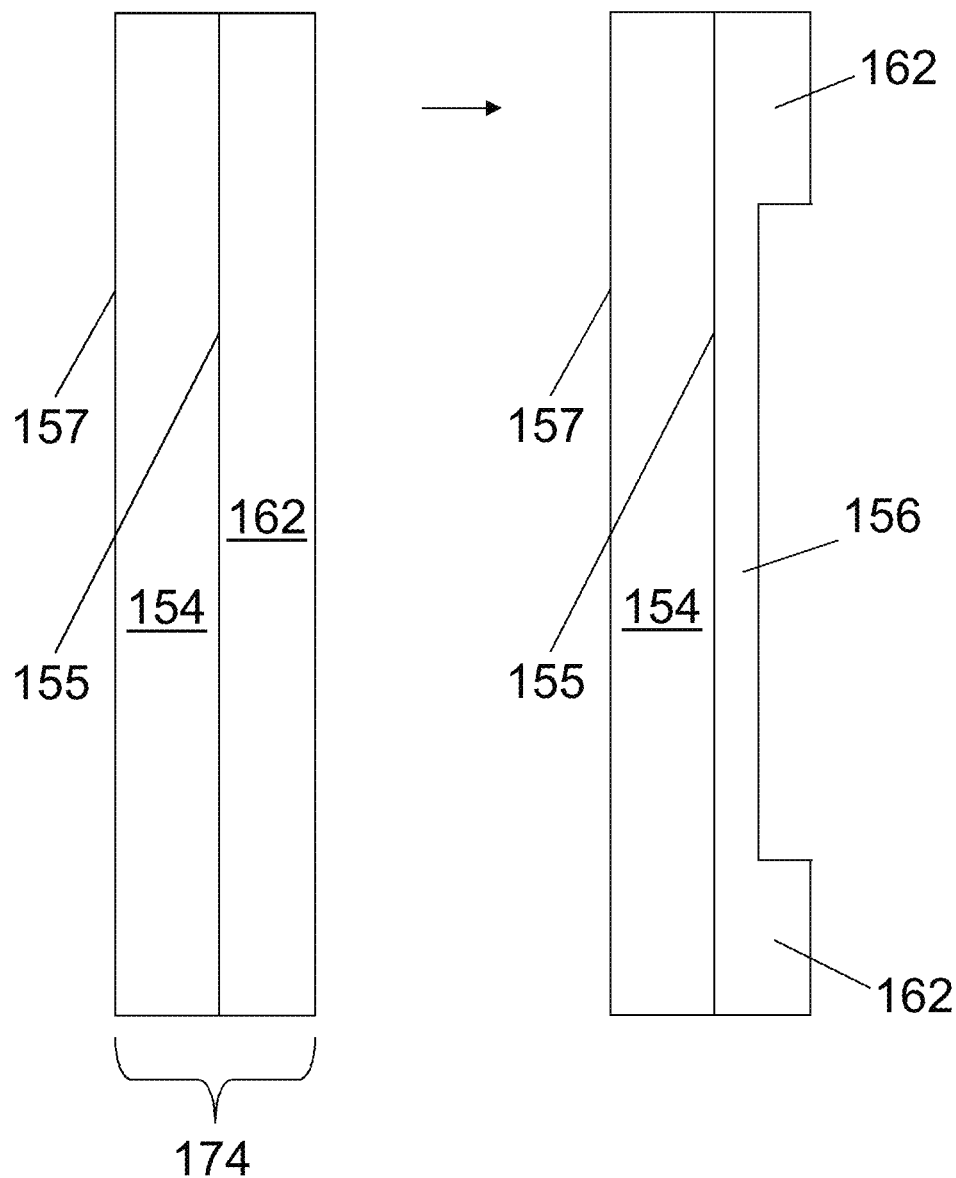
FIG. 2 is a schematic illustration of a composite soot sheet.

As shown in FIG. 1, first soot sheet 154 has a contact surface 155 and a free surface 157. According to the illustrated embodiment, a second optional soot providing device 116 forms a stream of second glass soot particles 160 that are deposited on the contact surface 155. Together, as illustrated in FIG. 2, first soot sheet 154 and second soot layer 162, which comprises second glass soot particles 160, form a composite soot sheet 174. As a result of heating the composite soot sheet, the first and second glass soot particles can sinter to form a composite glass sheet or, alternatively, the second glass soot particles 160 can sinter to form glass sheet 156, while the first glass soot particles are not sintered and the first soot sheet 154 is substantially unchanged by the heating.

According to un-illustrated embodiments, after first soot sheet 154 is released from the deposition surface, multiple additional soot layers can be deposited thereon. The additional soot layers can be deposited simultaneously or successively on one or both sides of the first soot sheet 154 (i.e., directly in contact with the contact surface 155 or the free surface 157, or directly in contact with one or more previously-deposited soot layers formed over the contact surface or the free surface). A soot-gathering device can be used in conjunction with each of a plurality of optional soot deposition steps.

In an embodiment, a composition of second glass soot particles that are deposited on the contact surface of the first soot sheet is substantially identical to a composition of second glass soot particles that are deposited on free surface of the first soot sheet. In an alternate embodiment, a composition of second glass soot particles that are deposited on the contact surface of the first soot sheet is different than a composition of second glass soot particles that are deposited on free surface of the first soot sheet. By forming second soot layers on both sides of first soot sheet 154, it is possible during a single heating step to form a composite glass sheet (in the example where both the first and second glass soot particles are sintered) or simultaneously form two glass sheets having the same or different compositions (in the example where only second glass soot particles formed over opposing surfaces of the first soot sheet are sintered).

According to an embodiment, a composite soot sheet comprises at least two glass soot layers and has a pair of exposed major opposing surfaces. By depositing at least one of the glass soot layers on the contact layer of the original soot sheet, both of the exposed surfaces of the composite soot sheet are free surfaces.

In an example of a first soot sheet comprising at least 90 mole % silica, an average soot density of the soot sheet can range from about 0.3 to 1.5 g/cm$^3$, e.g., from about 0.4 to 0.7 g/cm$^3$, or from about 0.8 to 1.25 g/cm$^3$, and an average thickness of the first soot sheet 154 can range from 10 to 600 µm, e.g., 20 to 200 µm, 50 to 100 µm or 300 to 500 µm.

Subsequently-deposited soot layers (i.e., a soot layer 162 formed from glass soot particles deposited on at least one of the contact surface and the free surface) can each have an average thickness of 10 to 600 µm, e.g., 20 to 200 µm, 50 to 100 µm or 300 to 500 µm. A total thickness of a resulting composite soot sheet can range from 100 µm to 5 cm.

A composition of the second soot sheet can comprise up to 50 wt. % silica, and can include, for example, about 20 wt. % germania, about 20 wt. % $P_2O_5$, and 10 wt. % alumina.

In certain embodiments, particularly those involving continuous soot sheet and/or sintered glass sheet production, continuous movement of the first soot sheet 154 away from the deposition surface after its release can be aided by a soot sheet guiding device 130. The soot sheet guiding device 130 can directly contact at least a portion of the soot sheet 154 in order to aid movement and provide mechanical support for the soot sheet.

To maintain a high surface quality of the first soot sheet 154, the soot sheet guiding device 130 may contact only a portion (e.g., an edge portion) of the first soot sheet 154. In certain embodiments, the soot sheet guiding device comprises a pair of clamping rollers that can grip an edge portion of the soot sheet and guide the soot sheet through a soot sheet sintering device.

In a similar vein, continuous movement of a composite soot sheet 174 away from the deposition surface can be facilitated by the soot sheet guiding device 130. The soot sheet guiding device 130 can directly contact at least a portion of the composite soot sheet 174 in order to aid movement and provide mechanical support. As shown in FIG. 1, to maintain a high surface quality of the composite soot sheet 174, the soot sheet guiding device 130 may contact only a portion (e.g., an edge portion) thereof.

Using a soot sheet guiding device, a continuous composite soot sheet 174 can be fed into a sintering/annealing zone of a soot sheet sintering device 140 where at least a portion of the composite soot sheet is heated at a temperature and for a period of time sufficient to convert it into partially or fully densified glass. For example, a composite soot sheet comprising a high purity silica first soot sheet and a second soot sheet can be heated at a temperature of less than 1200° C., e.g., from about 700° C. to 1000° C. such that the second soot sheet is sintered to form a dense glass sheet, while the first (silica) soot sheet is unsintered. The sintering temperature and the sintering time can be controlled in order to control the formation of voids and/or gas bubbles within the sintered glass sheet. As an example, the sintering temperature and the sintering time can be controlled in order to form a sintered glass sheet that is essentially free of voids and gas bubbles.

As used herein, sintering refers to a process whereby second glass soot particles are heated below their melting point (solid state sintering) until they adhere to each other. Annealing is a process of cooling glass to relieve internal stresses after it was formed. Sintering and annealing can be carried out sequentially using the same or different apparatus.

In the embodiment of a sacrificial first soot sheet, i.e., where the first soot sheet is not sintered, but merely supports one or more second soot sheets, after the second soot sheet (or composite soot sheet) is sintered to form a dense glass sheet, the sintered glass sheet can separated from the first soot layer by virtue of, for example, a CTE or thermal mismatch between the respective layers. The unsintered first soot sheet can be discarded or, optionally, sintered at an elevated temperature (e.g., from about 1200° C. to 1700° C.) to form a separate glass sheet.

The glass sheet formation process may be controlled in order to minimize strain (e.g., sagging) of both the soot sheet and the resulting glass sheet. One way to minimize strain is to orient the soot sheet(s) substantially vertically during sintering. According to embodiments, an angle of orientation of the soot sheet with respect to a vertical orientation can be less than 15 degrees (e.g., less than 10 or 5 degrees).

Sintering involves passing a glass soot sheet through a sintering zone of a soot sheet-sintering device. During sintering, a sintering front, which represents a boundary between sintered and unsintered material, advances across the second soot sheet until it reaches an edge of the soot sheet or another sintering front. According to an embodiment, the second glass soot sheet is heated and sintered across up to 90% of its width (e.g., 20, 50 or 75% of its width).

A suitable soot sheet-sintering device for conducting the sintering can include one of a variety of designs such as, for example, gas oxy-torches, inductive heaters, resistive heaters and lasers. One feature of the designs may be the ability to sinter only a portion of the second glass soot sheet width at any given time such that the segment being sintered can be in contact with and thus be supported by (e.g., tensioned by) either previously-sintered soot or unsintered glass soot sheet along a width direction.

A variety of different soot sheet-sintering devices such as resistive heating and induction heating devices can be used to sinter the soot sheet. The thermal history of both the soot sheet and the glass sheet can affect the final thickness, composition, compositional homogeneity and other chemical and physical properties of the final product. A glass sheet can be formed by applying heat to one or both of the major surfaces of the second soot sheet. During sintering, various parameters can be controlled including temperature and temperature profile, time, and atmosphere.

Though a sintering temperature can be selected by skilled artisan based on, for example, the composition of the second soot sheet to be sintered, a sintering temperature can range from about 700° C. to 1200° C. Further, a homogeneous temperature profile, which is achievable with various heating sources including both resistive and induction heating sources, can be used to create homogeneity within the final glass sheet. By "homogeneous temperature profile" is meant a sintering temperature that varies by less than 20% (e.g., less than 10 or 5%) over a predetermined sample area or sample volume.

In embodiments where an edge portion of the composite soot sheet 174 is held and guided by the soot sheet-guiding device, that edge portion is typically not sintered by the sintering device. For example, in one embodiment, the center 10 cm of a soot sheet having an average thickness of about 400 microns and a total width of 24 cm was heated to produce a sintered glass sheet having a width of about 10 cm and an average thickness of about 100 microns. Prior to sintering, an average density of the soot sheet is about 0.5 g/cm$^3$.

In addition to controlling the temperature and the temperature profile during sintering, the gas ambient surrounding the soot sheet/glass sheet can also be controlled. Specifically, both the total pressure as well as the partial pressure of suitable sintering gases can be selected in order to control the sintering process. In certain embodiments, a controlled gas mixture can comprise one or more active or inert gases such as, for example, He, $O_2$, $CO_2$, $N_2$, $Cl_2$, Ar or mixtures thereof.

During the act of sintering, the soot sheet may be held stationery within a sintering zone or moved continuously or semi-continuously through such a zone. For example, in a continuous glass sheet forming process, a rate of production of the soot sheet as it is released from the soot deposition surface may be substantially equal to a rate of translation of the soot sheet through the sintering zone. Sintering may be performed via one or more passes through a sintering zone using the same or different sintering conditions. A linear velocity of the soot sheet through the sintering zone can range from 0.1 mm/sec to 10 mm/sec (e.g., 0.1, 0.2, 0.5, 1, 2, 3, 4, 5 or 10 mm/sec). In scale-up, it is believed that the linear velocity of the deposition surface can be increased up to 1 m/sec or higher. A distance from the heater to the soot surface can range from about 1 mm to 200 mm (e.g., 1, 5, 10, 20, 50, 100 or 200 mm or more).

The disclosed process in various embodiments may be used to form thin glass sheets having high coefficient of thermal expansion. Such materials, because of their correspondingly low melting temperature and low sintering temperature may be difficult to form as a first soot sheet that is released directly from a deposition surface. Rather, according to one present approach, the second glass soot particles, which will form the glass sheet, are formed over a previously-formed soot sheet that comprises a higher melting temperature and thus a higher sintering temperature material that does not sinter during the step of sintering. For example, the second glass soot particles can be formed over a soot sheet comprising fused or glassy silica, which has a coefficient of thermal expansion of about $5\times10^{-7}$/° C. According to embodiments, the resulting glass sheets may have a coefficient of thermal expansion greater than $6\times10^{-7}$/° C. (e.g., a coefficient of thermal expansion of the sintered glass sheet may be greater than $6\times10^{-7}$, $8\times10^{-7}$, $10\times0^{-7}$, $12\times10^{-7}$, $15\times10^{-7}$, $30\times10^{-7}$/° C. or $40\times10^{-7}$/° C.). For example, a glass sheet can have a coefficient of thermal expansion between $6\times10^{-7}$/° C. and $30\times10^{-7}$/° C. or between $32\times10^{-7}$/° C. and $50\times10^{-7}$/° C.

Once formed, the glass sheet may be divided into discrete pieces by a suitable cutting device. For example, a laser can be used to cut or trim the glass sheet into smaller pieces. In a further example, a laser can be used to trim the glass sheet from the unsintered soot sheet. Further, before or after cutting, the sintered glass can be subjected to one or more post-sintering processes, such as edge removal, coating, printing, polishing, etc. A long ribbon of sintered glass sheet can be reeled by a reeling device into a roll. Optionally, spacing materials such as paper sheet, cloth, coating materials, etc. can be inserted in between adjacent glass surfaces in the roll to avoid direct contact there between.

The process and apparatus disclosed herein are suited for making soot sheets and sintered glass sheets comprising a low percentage of silica, e.g., "low-silica" glass sheets. By "low-silica" is meant a glass composition comprising less than 50 mole % silica glass, e.g., about than 5, 10, 15, 20, 25, 30, 35, 40, or 45 mole % silica. An example low-silica glass is an aluminoborosilicate glass. Optionally, the second glass soot particles can comprise (e.g., in the form of one or more oxides) titanium, germanium, boron, aluminum, phosphorus, rare earth metals and/or alkaline or alkaline earth metals.

Flexible sintered glass sheets, including long glass ribbons, can be formed. Sintered glass sheets such as low-silica glass sheets can have an average thickness of 200 microns or less (e.g., less than 150, 100, 50, or 25 microns). According to embodiments, however, the sintered glass sheets can have a thickness of 10, 20, 50, 100, 200, 500, 1000, 2000, 5000, 10,000 or 12,500 μm. By controlling width of the deposited soot layer(s), the width of the sintering zone, and the amount of deposition time, it is possible to independently control both the width and the length of sintered glass sheets. A length of the glass sheet can range from about 2.5 cm to 10 km. A width of the glass sheet can range from about 2.5 cm to 2 m.

The process can be used to form high surface quality glass sheets (e.g., glass sheets having low surface waviness, low surface roughness, and which are essentially free from scratches). The above-disclosed process, which can include an initial step of forming a soot sheet on a roll, and a final step of reeling a sintered, flexible glass sheet onto a roll, can be referred to as a "roll-to-roll" process. The resulting glass sheets, including low-silica glass sheets, can be characterized by a number of properties including composition, thickness, surface roughness, surface uniformity, CTE and flatness.

As used herein, "soot layer" or "layer of soot" refers to a stratum of essentially homogeneously-distributed glass particles that are optionally bonded with each other. The layer generally has an average total thickness that is greater than or equal to an average diameter of individual particles. Further, a soot layer may comprise a single soot layer having an essentially homogeneous composition or multiple soot layers each having an essentially homogeneous composition.

In embodiments where the second soot layer comprises multiple layers, one species of glass particles can form one soot layer, while a second species of glass particles can form another soot layer adjacent thereto. Thus, respective soot layers can have distinctive compositional and/or other properties. Moreover, in an interfacial region between the adjacent layers, blending of the two species of particles can occur such that the composition and/or properties at the interface of contiguous layers may deviate from the bulk values associated with each respective layer.

Reference herein to a "glass sheet" includes both sheet materials comprising a plurality of glass soot particles (i.e., soot sheets) and sheet materials made of sintered glass. As is typically understood in the art, a sheet has two major opposing surfaces that are typically substantially parallel to each other, each having an area larger than that of other surfaces. A distance between the two major surfaces at a certain locations is the thickness of the sheet at that particular location. A sheet may have a substantially uniform thickness between the major surfaces, or the thickness can vary spatially either uniformly or non-uniformly. In certain other embodiments, the two major surfaces can be non-parallel, and one or both of the major surfaces can be planar or curved. The glass sheet can be a substantially homogeneous glass sheet or a composite glass sheet having layer-specific attributes.

As used herein, "sintered glass" refers to a glass material having a density of at least 95% of a theoretical density (Dmax) for a glass material having the same chemical composition and microstructure under conditions of standard temperature and pressure (STP) (273 K and 101.325 kPa). In certain embodiments, it is desired that the sintered glass has a density of at least 98%, 99% or 99.9% of Dmax under STP.

Additional aspects of glass sheet formation using a glass soot deposition and sintering process are disclosed in commonly-owned U.S. Pat. No. 7,677,058 and in commonly-owned U.S. Pat. Application Pub. Nos. 2010/0291346, 2010/0319401, and 2011/0014445, the contents of which are incorporated herein by reference in their entirety.

As used herein, the singular forms "a," "an" and "the" include plural referents unless the context clearly dictates otherwise. Thus, for example, reference to a "conductive plate" includes examples having two or more such "conductive plates" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for making a glass sheet, said method comprising:
   providing glass soot particles;
   depositing a first fraction of the glass soot particles on a deposition surface to form a supported soot layer;
   electrostatically attracting and collecting a second fraction of the glass soot particles onto a surface of a charged plate;
   exhausting a third fraction of glass soot particles away from the soot sheet, the third fraction corresponding to a further fraction of glass soot particles that are not deposited to form the supported soot layer;
   removing the soot layer from the deposition surface to form a soot sheet; and
   heating at least a portion of the first fraction of the glass soot particles to form a glass sheet.

2. The method according to claim 1, wherein the second fraction of glass soot particles are provided with a first charge and the charged plate is provided with a second charge that is opposite in sign to the first charge.

3. The method according to claim 1, wherein an electrostatic field induced by the charged plate has a potential in a range of 0.2 to 10 kV/cm.

4. The method according to claim 1, wherein the first fraction of the glass soot particles is at least 50% of the glass soot particles provided.

5. The method according to claim 1, wherein the second fraction of the glass soot particles is at least 1% of the glass soot particles provided.

6. The method according to claim 1, wherein the soot sheet has a substantially uniform thickness.

7. The method according to claim 1, wherein the glass sheet has an average thickness ranging from 25 μm to 1.25 cm.

8. The method according to claim 1, wherein the soot sheet is substantially free of surface particles.

9. The method according to claim 1, wherein the glass sheet is substantially free of surface particles.

10. The method according to claim 1, wherein the glass sheet comprises at most ten surface particles per square meter having a size greater than 5 nm.

11. The method according to claim 1, further comprising laser trimming the glass sheet.

12. The method according to claim 1, further comprising reeling at least part of the glass sheet onto a roll.

13. The method according to claim 1, wherein the charged plate is oriented such that a major face of the plate is facing the soot sheet.

14. The method of claim 1, wherein the glass soot particles are negatively charged and the charged plate is positively charged.

15. The method of claim 1, wherein the layer of soot has a substantially uniform thickness, that being a thickness variation of less than or equal to 20% of an average thickness thereof.

16. A method for making a glass sheet, said method comprising:
providing glass soot particles;
depositing a first fraction of the glass soot particles on a deposition surface to form a supported soot layer;
electrostatically attracting and collecting a second fraction of the glass soot particles onto a surface of a charged plate;
removing the soot layer from the deposition surface to form a soot sheet, wherein the charged plate is positioned across a width of the soot sheet; and
heating at least a portion of the first fraction of the glass soot particles to form a glass sheet.

17. The method of claim 16, wherein the charged plate is oriented such that a major face of the plate is facing the soot sheet.

18. The method of claim 16, wherein the glass soot particles are negatively charged and the charged plate is positively charged.

19. The method of claim 16, wherein the layer of soot has a substantially uniform thickness, that being a thickness variation of less than or equal to 20% of an average thickness thereof.

20. The method of claim 16, wherein the glass sheet is substantially free of surface defects such that the glass sheet comprises at most ten surface particles per square meter having a size greater than 5 nm.

21. A method for making a glass sheet, said method comprising:
providing glass soot particles;
depositing a first fraction of the glass soot particles on a deposition surface to form a supported soot layer;
electrostatically attracting and collecting a second fraction of the glass soot particles onto a surface of a charged plate;
removing the soot layer from the deposition surface to form a soot sheet, wherein the charged plate forms a barrier effective to block a fraction of the glass soot particles from migrating into the soot sheet; and
heating at least a portion of the first fraction of the glass soot particles to form a glass sheet.

22. The method of claim 21, wherein the charged plate is oriented such that a major face of the plate is facing the soot sheet.

23. The method of claim 21, wherein the glass soot particles are negatively charged and the charged plate is positively charged.

24. The method of claim 21, wherein the glass sheet is substantially free of surface defects such that the glass sheet comprises at most ten surface particles per square meter having a size greater than 5 nm.

* * * * *